Sept. 20, 1932.   P. J. SCIARRINO   1,878,718
CLEAR VISION DEVICE
Filed Jan. 15, 1931   2 Sheets-Sheet 2
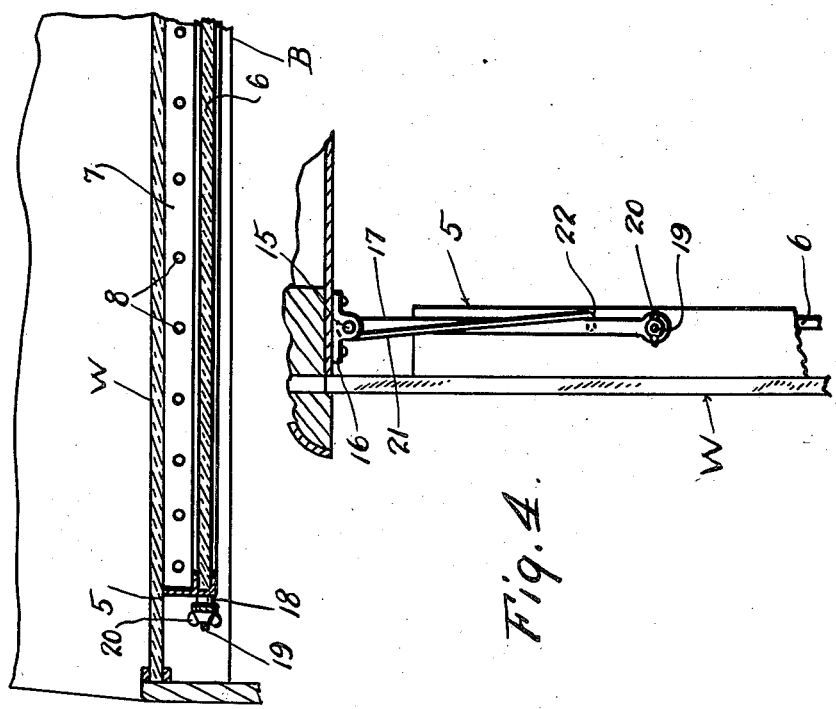
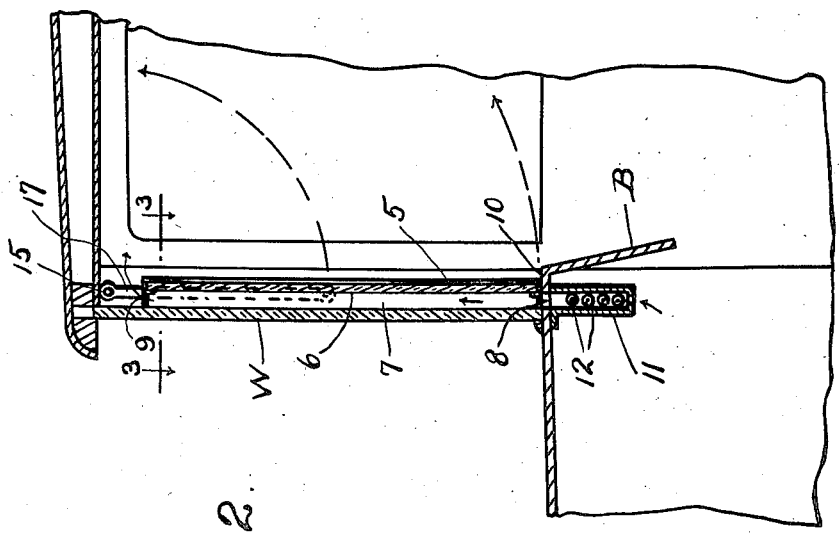
Inventor
*P. J. Sciarrino*
By *Clarence A. O'Brien*
Attorney Patented Sept. 20, 1932

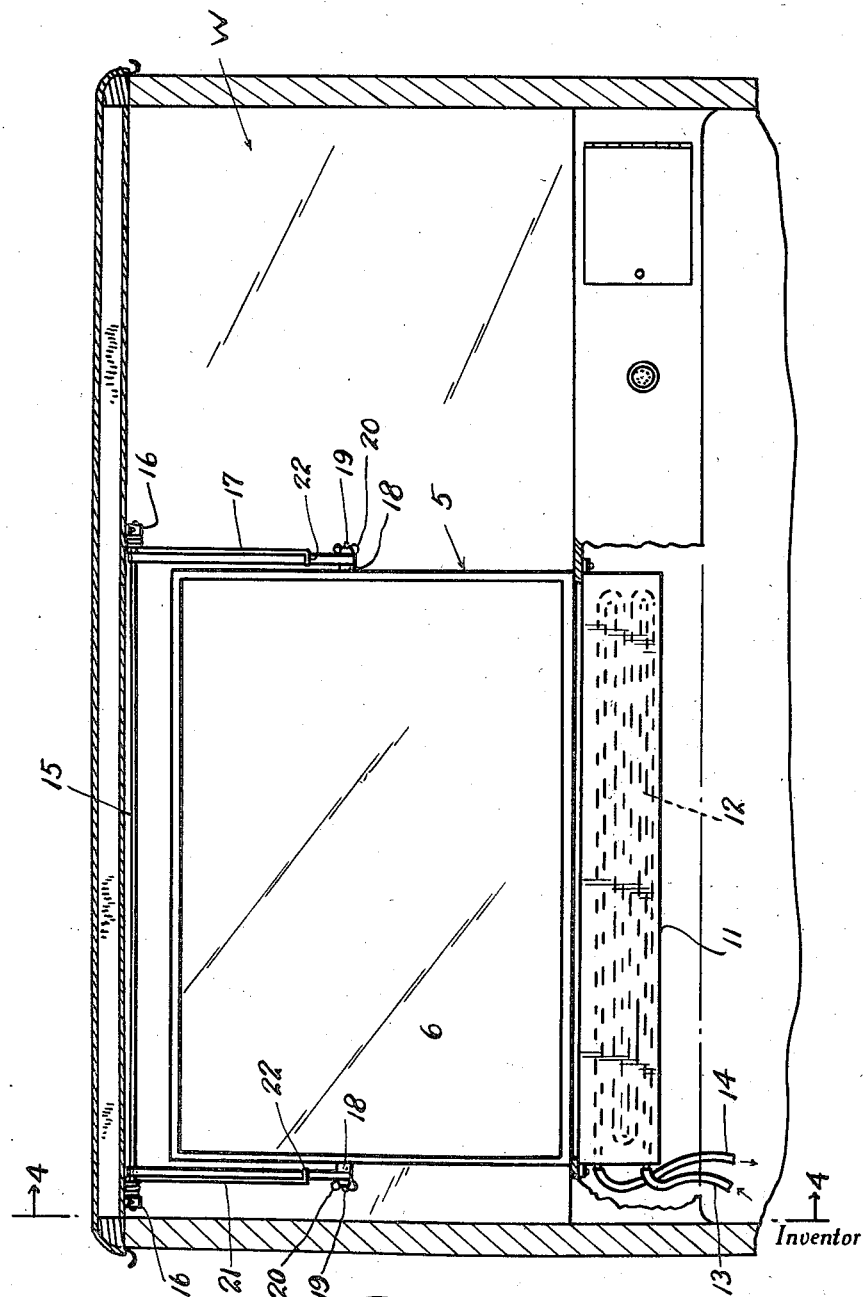

1,878,718

UNITED STATES PATENT OFFICE

PETER J. SCIARRINO, OF NIAGARA FALLS, NEW YORK

CLEAR VISION DEVICE

Application filed January 15, 1931. Serial No. 509,008.

This invention relates to a device for use in connection with automobile windshields, and the object of the invention is to provide means which may be secured to the windshield of the automobile to provide an air space for the reception of heated air whereby the latter may be distributed over the surface of the windshield to heat the same, thus preventing the accumulation of snow, ice and sleet on the windshield whereby to provide on the windshield at all times a clear vision area.

A still further object of the invention is the provision of a device for the above purpose which may be mounted in such a manner as to be capable of movement into and out of operative position with respect to the windshield for cleaning either the transparent element of the device, or the windshield, or both.

A still further object of the invention is to provide a device for the purpose above specified, which also includes a heating element adapted to be located adjacent the lower edge of the windshield for directing heated air on to the windshield.

Other objects and advantages of the invention will become apparent during a study of the following description, taken in connection with the accompanying drawings wherein:

Figure 1 is a fragmentary elevational sectional view looking at the inside of an automobile windshield for clearly illustrating the application of my invention.

Figure 2 is a vertical transverse sectional view taken through the device, the same being shown as applied.

Figure 3 is a fragmentary detail sectional view taken substantially on the line 3—3 of Figure 2.

Figure 4 is a vertical sectional view taken substantially on the line 4—4 of Figure 1.

With reference more in detail to the drawings, it will be seen that the invention comprises a substantially rectangular frame 5 that has suitably mounted therein a transparent panel 6. Panel 6 may be of glass, or any other suitable transparent material. One face of the frame is adapted to contact the inner side of the windshield and the panel 6 is spaced from the windshield so that when the device is in position for use there is provided between the windshield and the panel 6 an air space 7. The frame at the bottom thereof is provided with inlet openings 8 and at the top thereof with outlet openings 9.

Frame 5 and panel 6 may be of any desired size, but preferably of a size which when in position for use will be in the normal line of vision of the driver of the automobile. The same frame and panel carried thereby extending for substantially the full length of the windshield desired or for a portion of the windshield as suggested in the drawings.

The lower edge portion of the windshield rests on the horizontal extension 10 of the instrument board B of the automobile. Suitably mounted behind the inclined wall of the instrument board is a heater casing 11 that has its open top registering with the inlet openings 8 of the frame 5. (See Figure 2.)

Any suitable heating element may be arranged in the casing 11 as for example an electrical heating element, a hot air heating element or the like. However I have found to be most practical and efficient as a heating medium, a coil 12 arranged within the casing 11 and adapted to have circulated therethrough hot water from the motor of the internal combustion engine.

Preferably the coil is formed of copper tubing, and to one end of the coil is coupled a feed hose 13 which hose at its opposite end is suitably coupled to the water that goes from the water pump to the radiator of the internal combustion engine. The outlet end of the coil has attached thereto a flexible hose 14 which leads to the water jacket of the motor or any other part of the water circulating system as will permit of a continuous circulation of water through the heating coil 11.

Thus it will be apparent that the air in the space 7 will be heated, the heated air circulating through the space and passing outwardly therefrom through the openings 9 in the top of the frame. The heated air in the space 8 will warm the windshield to such an extent as to make it impossible for ice or snow or for condensation to remain on the outside of the windshield. At all times then the operator of the vehicle will be provided with a clear vision area on the windshield.

Suitable means are provided for supporting the frame adjacent the windshield whereby the frame may be swung inwardly away from the windshield, and may be rotated to facilitate cleaning either side of the transparent panel 6 or the inner space of the windshield as may be desired.

To this end there is provided a horizontal rod 15 supported between a pair of brackets 16 which are fastened by screws to the wooden frame above the windshield W. Arms 17 are pivotally engaged at their upper ends with the rod 15, and each arm at its lower end is provided with a bearing 18 in which is journalled a pintle 19 projecting from an adjacent end of the frame 5. Thus it will be seen that the frame is pivotally mounted between the arms 17 and will be retained against casual rotative movement through the medium of thumb screws 20 threadedly engaging the pintles 19.

Springs 21 at one end are suitably anchored to the rod 15, and at their opposite ends provided with lateral extensions 22 engaging the arms 17 for normally urging frame 5 against the windshield W.

If it be desired to clean the inner face of the windshield, arms 17 may be swung upwardly carrying frame 5 therewith thus permitting access to the inner face of the windshield. Sufficient clearance is also provided between rod 15 and the upper edge of frame 5 to permit the frame to be rotated so as to facilitate cleaning of either side of the channel 6.

Even though I have herein shown and described the preferred embodiment of the invention it is to be understood that the same is susceptible of further changes, modifications and improvements coming within the scope of the appended claims.

Having thus described my invention, what I claim as new is:

1. In an automobile, in combination, a cowl, an instrument board separated from the cowl by a transversely extending opening, a windshield at one side of said opening, an auxiliary panel paralleling the windshield and disposed at a relatively opposite side of said panel, a frame within which said auxiliary panel is mounted, said frame having apertured top and bottom members and having said bottom member disposed over said opening, a casing mounted behind the instrument board and having an open side alined with said opening, and a coil of tubing arranged in said casing and having inlet and outlet ends passing through a wall of the casing.

2. In an automobile, in combination, a cowl, a windshield having its edge arranged to rest on the cowl, an instrument board having at its upper edge a horizontal extension spaced from the proximate edge of said cowl, a frame having its lower side bridging the space between said cowl and extension, and having said side provided with a row of apertures, a transparent panel mounted in the frame, a casing suspended from the under sides of said cowl and extension and having an open top side registering with said apertures, and an air heating device arranged within said casing.

In testimony whereof I affix my signature.

PETER J. SCIARRINO.